(12) United States Patent
Lim et al.

(10) Patent No.: US 9,669,553 B2
(45) Date of Patent: Jun. 6, 2017

(54) ONE-TOUCH COUPLING/DECOUPLING APPARATUS FOR ROBOT FOOT

(71) Applicant: Hyundai Motor Company, Seoul (KR)

(72) Inventors: Hyun Seop Lim, Gyeonggi-do (KR); Kyung Mo Jung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 327 days.

(21) Appl. No.: 14/324,706

(22) Filed: Jul. 7, 2014

(65) Prior Publication Data
US 2015/0167711 A1 Jun. 18, 2015

(30) Foreign Application Priority Data
Dec. 13, 2013 (KR) .................. 10-2013-0155494

(51) Int. Cl.
*B25J 15/04* (2006.01)
*F16B 2/10* (2006.01)
*F16B 5/06* (2006.01)

(52) U.S. Cl.
CPC ............ *B25J 15/0408* (2013.01); *F16B 2/10* (2013.01); *F16B 5/065* (2013.01); *F16B 5/0657* (2013.01); *Y10T 403/59* (2015.01)

(58) Field of Classification Search
CPC ... A61H 3/00; B25J 9/006; B25J 17/00; B25J 19/06; A63C 9/08; A63C 9/0846; A63C 9/0847; A63C 9/08557; A63C 9/086; A63C 10/12; A63C 13/001
See application file for complete search history.

(56) References Cited

U.S. PATENT DOCUMENTS

| | | | | |
|---|---|---|---|---|
| 4,923,207 A | * | 5/1990 | Pozzobon | A63C 9/086 280/605 |
| 6,299,192 B1 | * | 10/2001 | Bryce | A63C 9/086 280/14.22 |

FOREIGN PATENT DOCUMENTS

| | | | | |
|---|---|---|---|---|
| DE | 10 2009 046 396 | * | 5/2011 | ............. A63C 9/085 |
| FR | 2 652 753 | * | 4/1991 | ............. A63C 9/00 |
| FR | 2 723 319 | * | 2/1996 | ............. A63C 13/00 |
| JP | 2012016782 A | | 1/2012 | |
| JP | 2013-094323 A | | 5/2013 | |
| KR | 20-2000-0002633 U | | 2/2000 | |
| KR | 20-0280382 Y1 | | 7/2002 | |
| KR | 10-2010-0112816 A | | 10/2010 | |
| KR | 10-2013-0045776 | | 5/2013 | |

* cited by examiner

*Primary Examiner* — Michael P Ferguson
(74) *Attorney, Agent, or Firm* — Mintz Levin Cohn Ferris Glovsky and Popeo, P.C.; Peter F. Corless

(57) ABSTRACT

A one-touch coupling/decoupling apparatus for a robot foot includes: a work shoe having a coupler protruding downwardly from a bottom of the work shoe; and a robot foot module coupled to the work shoe and having latches, each of which has one end formed in a hook shape so as to be coupled with the coupler.

4 Claims, 7 Drawing Sheets

ONE-TOUCH COUPLING/DECOUPLING APPARATUS FOR ROBOT FOOT

CROSS-REFERENCE TO RELATED APPLICATION

This application claims under 35 U.S.C. §119(a) the benefit of Korean Patent Application No. 10-2013-0155494 filed Dec. 13, 2013, which is incorporated by reference herein in its entirety.

BACKGROUND (a) Field of the Invention

The present invention relates to a coupling/decoupling robot foot and, more particularly, to a one-touch coupling/decoupling apparatus for a robot foot, capable of more easily coupling/decoupling the robot foot.

(b) Description of the Related Art

Generally, in order to use a wearable robot foot, a wearer places his or her foot in the robot foot, bends himself or herself forward, and fastens a buckle attached to the robot foot. This conventional robot foot provides very low convenience, and it takes a long time for a wearer to put on the robot foot.

Further, using the above-described conventional robot foot, it is not until the wearer bends himself or herself forward and unfastens the buckle in order to separate his or her foot from the robot foot in an emergency that the wearer can separate his or her foot from the robot foot. As such, it takes the wearer some time to separate his or her foot from the robot foot. Furthermore, the wearer should separate his or her foot from the robot foot in an emergency under precise control, or otherwise the wearer may be injured.

A leg and a foot for a humanoid walking robot are disclosed in Japanese Unexamined Patent Application Publication No. 2012-016782. The foot for a humanoid walking robot includes a first parallel link structure having four nodes of an active shaft 43, a first shaft 32a, a fourth shaft 32d, and a sixth shaft 32f and a second parallel link structure having four nodes of a second shaft 32b, a third shaft 32c, a fifth shaft 32e, and the sixth shaft 32f, along with a virtual parallel link structure that is an imaginary parallel link structure having four nodes of the first shaft 32a, the second shaft 32b, the sixth shaft 32f, and an imaginary shaft. Here, a heel-side sole surface that is a sole surface in which a heel-side foot comes into contact with a floor surface is formed on a half flat plane having the imaginary shaft and using the imaginary shaft as a boundary, and a toe-side sole surface that is a sole surface in which a toe-side foot comes into contact with the floor surface is formed on a half flat plane having the imaginary shaft and using the imaginary shaft as a boundary.

However, the above-mentioned related art has a complicated structure, and requires a long time for the robot foot to be coupled or decoupled.

The foregoing is intended merely to aid in the understanding of the background of the present invention, and is not intended to mean that the present invention falls within the purview of the related art that is already known to those skilled in the art.

SUMMARY

The present invention discloses a one-touch coupling/decoupling apparatus for a robot foot which has a simple structure, is easily coupled or decoupled even when a wearer does not bend himself or herself forward, and is easily controlled to enable the wearer to safely decouple the robot foot in an emergency.

In order to achieve the above object, according to one aspect of the present invention, there is provided a one-touch coupling/decoupling apparatus for a robot foot including: a work shoe having a coupler protruding downwardly from a bottom of the work shoe; and a robot foot module coupled to the work shoe and having a plurality of latches, each of which has one end formed in a hook shape so as to be coupled with the coupler.

The robot foot module may include a disk-shaped base formed on the bottom of the robot foot module, a plurality of supports fixed to an upper side of the base, and a plurality of long bar-shaped push parts that are coupled to the other ends of the latches and are vertically formed.

Each of the latches may be coupled to each push part and each support by pins, and when the push parts are pressed downwardly, the hooked one end of each latch is rotated upwardly around each support.

Each of the push parts includes a first fixing protrusion that protrudes from a lateral face thereof and has an inclined face that narrows in a downward direction.

Further, the robot foot module may include long bar-shaped fixtures that are vertically formed outside the base so as to correspond to the push parts.

Also, each of the fixtures may include first elastic members.

Further, each of the fixtures may include a second fixing protrusion that protrudes from a lateral face thereof and has an inclined face that widens in a downward direction.

Further, the latches, the push parts, and the fixtures may be formed so that the hooked one ends of the latches are disposed in opposite directions.

Further, the inclined face of the first fixing protrusion may slide along the inclined face of the second fixing protrusion so that bases of the first and second fixing protrusions are caught and fixed.

Meanwhile, the disk-shaped base may be coupled to the bottom of the robot foot module by a second elastic member, and return to an original state by an elastic force of the second elastic member even when the disk-shaped base is rotated.

Further, the bottom of the work shoe may include first connecting members, each push part of the robot foot module may include a second connecting member formed thereon, and the first and second connecting members may be coupled to each other so as to prevent the work shoe and the robot foot module from being decoupled after being coupled.

In addition, the first and second connecting members may be formed of a magnet.

According to the one-touch coupling/decoupling apparatus for a robot foot having the above-mentioned structure, a method of coupling or decoupling a typical wearable robot is remarkably changed, which simplifies a structure of the robot foot and enables a user to easily couple or decouple the robot foot. In addition, there is an advantage in that, when the robot foot should be inevitably decoupled due to imbalance or an emergency, the robot foot can be easily decoupled in a short time by rotation, and thus safety of the user is guaranteed.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, an exemplary embodiment of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
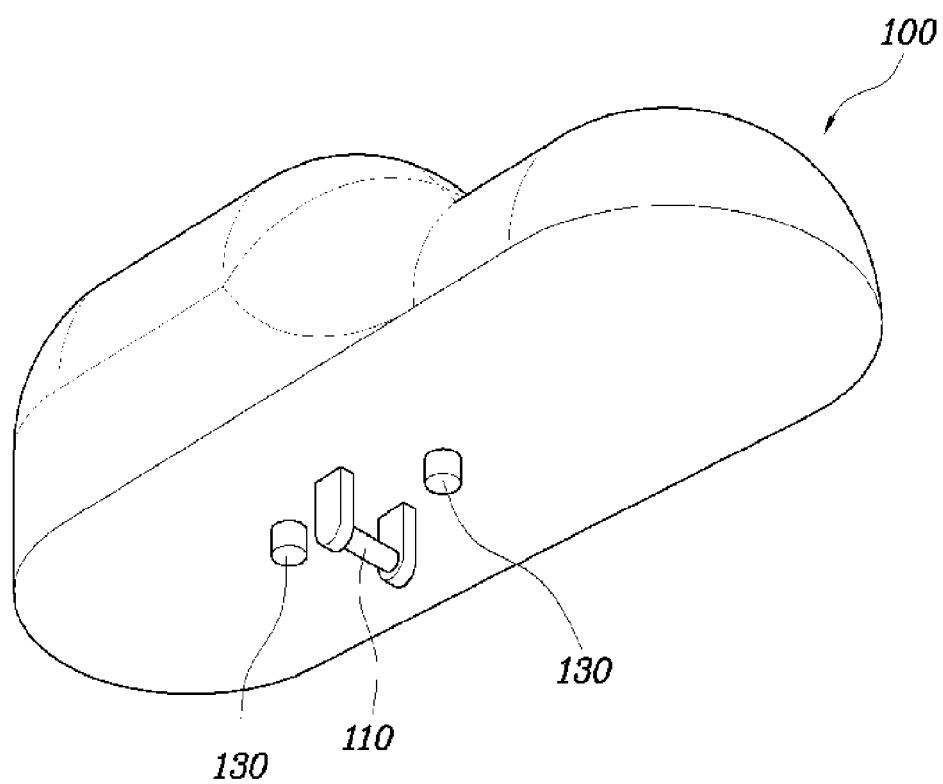
FIG. 1 is a perspective view of a work shoe for a one-touch coupling/decoupling apparatus for a robot foot according to an embodiment of the present invention.
Figure 2:
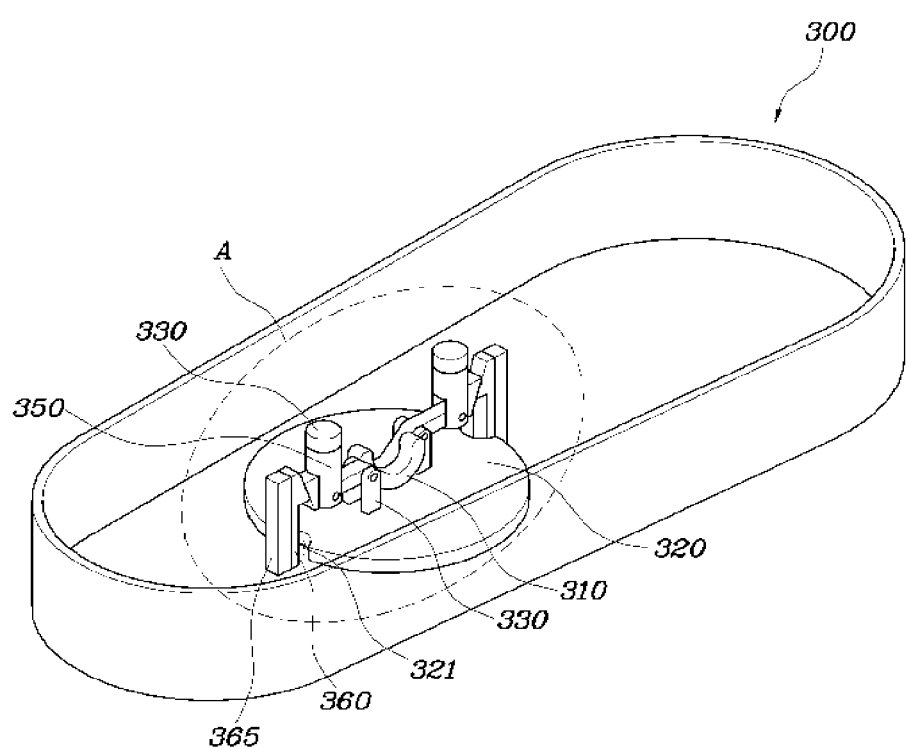
FIG. 2 is a perspective view of a robot foot module.
Figure 3:
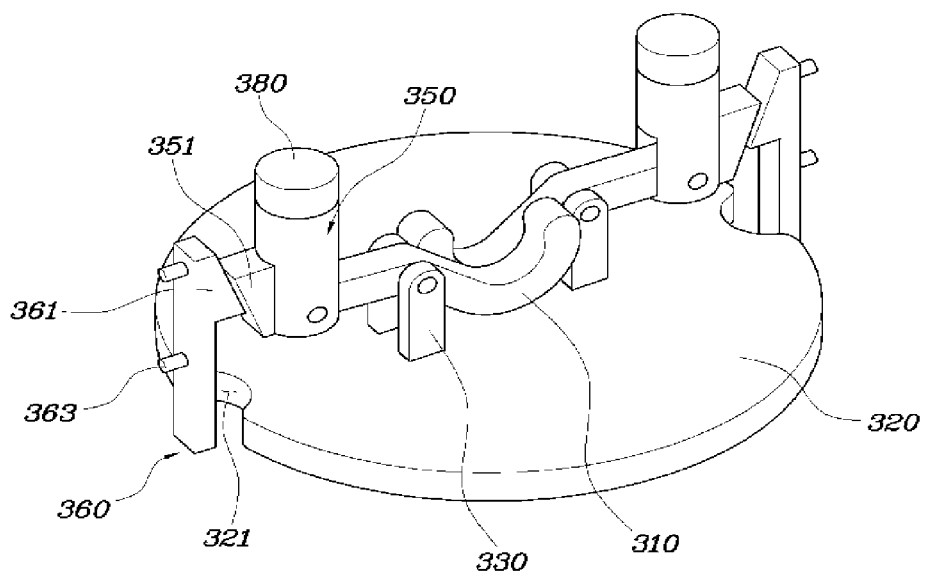
FIG. 3 is a detailed perspective view of a portion A of FIG. 2.
Figure 4:
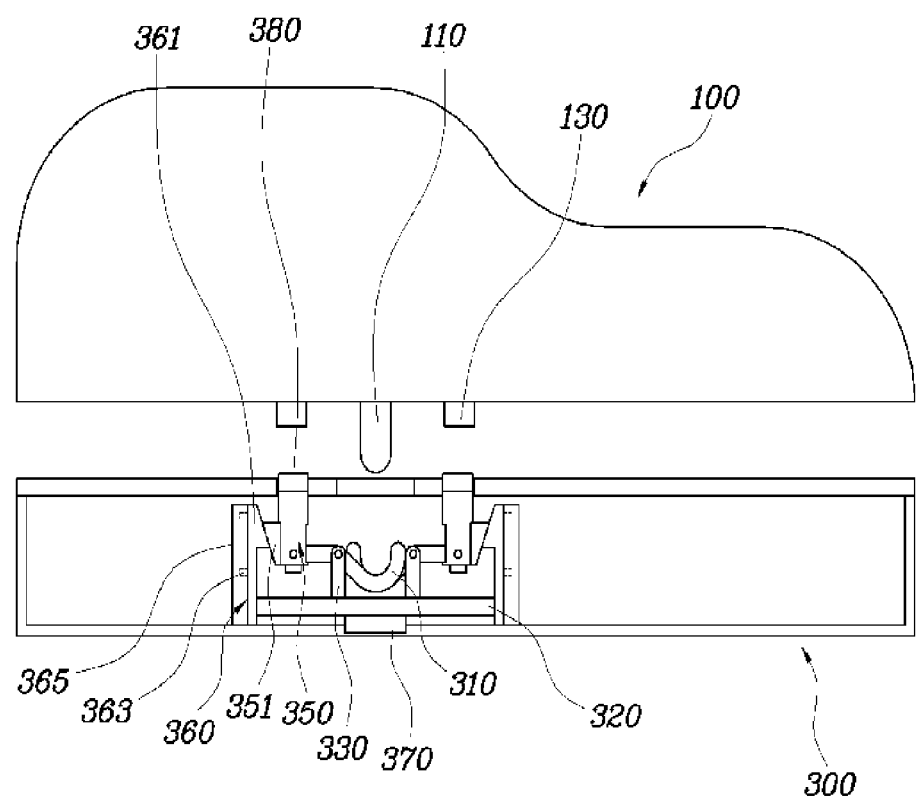
FIGS. 4 and 5 are side views depicting a coupling operation of a work shoe and a robot foot module.
Figure 5:
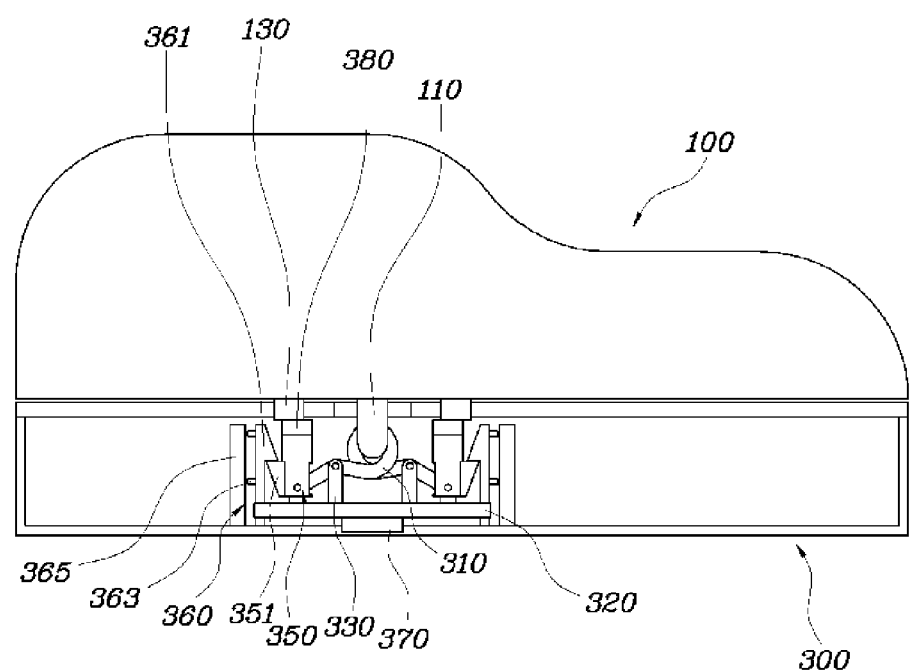
Figure 6:
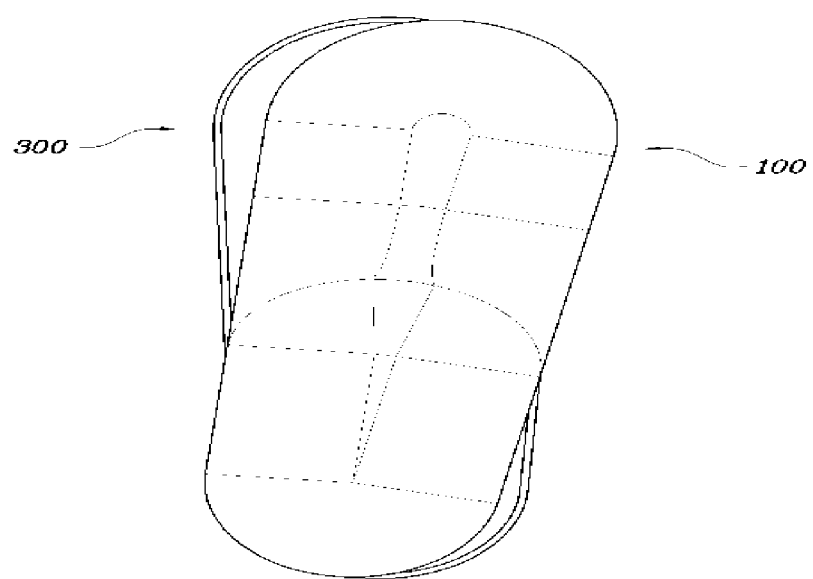
FIGS. 6 and 7 are views of a decoupling operation of a work shoe and a robot foot module.
Figure 7:
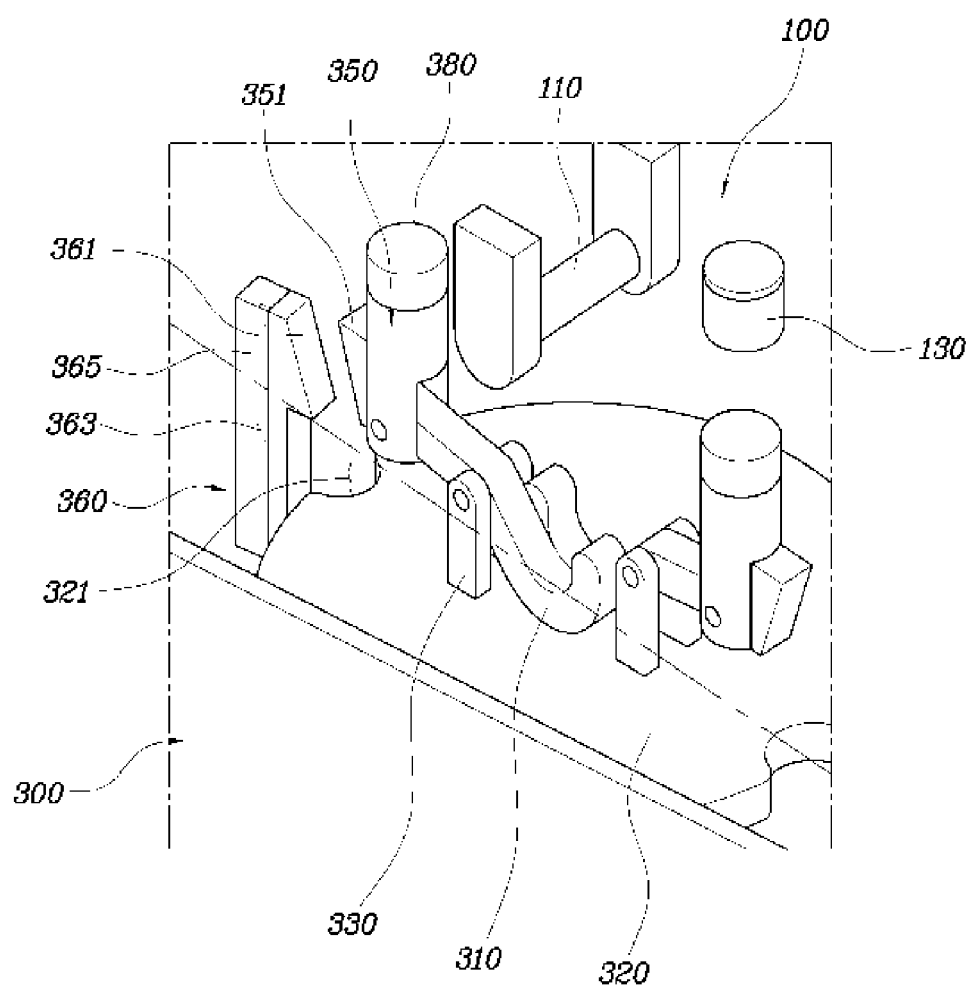

FIG. 1 depicts a work shoe 100 for a one-touch coupling/decoupling apparatus for a robot foot according to an embodiment of the present invention. FIG. 2 depicts a robot foot module 300. FIG. 3 is a detailed view of a portion A of FIG. 2. FIGS. 4 and 5 are views of a coupling operation of the work shoe 100 and the robot foot module 300. FIGS. 6 and 7 are views of a decoupling operation of the work shoe 100 and the robot foot module 300.

A one-touch coupling/decoupling apparatus of a robot foot according to an embodiment of the present invention includes the work shoe 100 having a coupler 110 protruding downwardly from to bottom of the work shoe 100; and the robot foot module 300 coupled to a lower part of the work shoe 100 and having a plurality of latches 310, each of which has one end formed in a hook shape so as to be coupled with the coupler 110. The robot foot module 300 includes a disk-shaped base 320 formed on the bottom of the robot foot module 300, a plurality of supports 330 fixed to an upper side of the base 320, and a plurality of long bar-shaped push parts 350 that are coupled to other ends of the latches 310 (where "other end" refers to an end opposite to each "one end" that is coupled to the coupler 110) and are vertically formed.

Each latch 310 is a rectangular prism that is horizontally formed, and has one end having a hook shape and an opposite end (i.e., "other end") coupled with each push part 350. A transition between a hooked portion and a linear portion of the latch 310 is coupled with the support 330 fixed to the base 320. When the work shoe 100 is coupled above the latches 310, the push parts 350 coupled with second coupling members 380 are pressed downwardly by first coupling members 130 formed in the bottom of the work shoe 100. Since each push part 350 is coupled to the other end of each latch 310 by a pin, one end of each latch 310 moves upwardly. However, a middle portion of each latch 310 is coupled with each support 330 by a pin, and each support 330 functions as a fulcrum of a lever. As such, only the hooked portion of each latch 310 is rotated upwardly at a predetermined angle due to the principle of a lever.

A first fixed protrusion 351 protrudes from a lateral face of each push part 350 toward a radial outer side of the base 320, and has an inclined face that is narrowed in a downward direction. In addition, the robot foot module 300 is provided with long bar-shaped fixtures 360 that are vertically formed outside the base 320 so as to correspond to the push parts 350.

The base 320 is provided with recesses 321 that are cut inwardly at positions of the fixtures 360 so as to easily find a position of the base 320 when assembled. A second fixing protrusion 361 protrudes from a lateral face of each fixture 360, and has an inclined face that is widened in a downward direction. First elastic members 363 are coupled inward to upper and lower sides of each fixture 360 in a direction perpendicular to each fixture 360. A separate support member 365 is coupled to a rear face of each fixture 360.

The inclined face of the first fixing protrusion 351 of each push part 350 and the inclined face of the second fixing protrusion 361 of each fixture 360 are formed to be symmetrical to each other. When the inclined face of the first fixing protrusion 351 slides downward in contact with the inclined face of the second fixing protrusion 361, bases of the first and second fixing protrusions 351 and 361 are caught and fixed.

The first elastic members 363 are compression springs, and elastically maintain a current state of the fixtures 360 when the work shoe 100 and the robot foot module 300 are decoupled. Further, one of the first elastic members 363 is located at a position at which the first fixing protrusion 351 and the second fixing protrusion 361 are in contact with each other before sliding, and the other of the first elastic members 363 is located at a position at which the first fixing protrusion 351 and the second fixing protrusion 361 are in contact with each other after sliding. The first and second fixing protrusions 351 and 361 elastically slide.

The latches 310, the push parts 350, and the fixtures 360 are formed at an angle of 180° so that the hooked portions of the latches 310 are disposed in opposite directions so as to be parallel to each other. Accordingly, the latches 310 of the work shoe 100 are more firmly engaged.

The base 320 is coupled to the bottom of the robot foot module 300 by a second elastic member 370, and returns to an original state by an elastic force of the second elastic member 370 even when the base 320 is rotated. The second elastic member 370 is a torsion spring, and forces the base 320 to return to the original state again by the elastic force even when twisted at a predetermined angle.

The first coupling members 130 are formed on the bottom of the work shoe 100, and the second coupling members 380 are formed on the push parts 350 of the robot foot module 300. The first coupling members 130 are coupled to the second coupling members 380. Therefore, the work shoe 100 and the robot foot module 300 are not decoupled after being coupled. The first and second coupling members 130 and 380 are made of a magnet, and are more tightly coupled, thus allowing the work shoe 100 and the robot foot module 300 to be more tightly coupled in place.

The above description is made of a coupling operation of the work shoe 100 and the robot foot module 300 shown in FIGS. 4 and 5. In summary, when the work shoe 100 is aligned with the robot foot module 300 and is vertically lowered, the first and second coupling members 130 and 380 are coupled by magnetic force. In this state, when the work shoe 100 is further pressed downwardly, the push parts 350 move down and the hooked portions of the latches 310 move up due to the principle of a lever.

At the same time, the first fixing protrusion 351 of each push part 350 slides along the second fixing protrusion 361 of each fixture 360. After the coupler 110 is completely caught by the hooked portions of the latches 310, the bases of the first and second fixing protrusions 351 and 361 are also fixed to each other, and the work shoe 100 and the robot foot module 300 are maintained in a fixed state.

Further, FIGS. 6 and 7 are diagrams for describing a decoupling operation of the work shoe 100 and the robot foot module 300. When the work shoe 100 is rotated relative to the robot foot module 300 at a predetermined angle or more by a predetermined force or more, the base 320 of the robot foot module 300 is rotated. Due to rotation of the base 320, the first fixing protrusion 351 of each push part 350 and the second fixing protrusion 361 of each fixture 360 deviate to be unfixed, so that the first fixing protrusion 351 of each push part 350 returns to an original state again. As such, the coupler 110 of the work shoe 100 is decoupled from the hooked portions of the latches 300, and the work shoe 100 and the robot foot module 300 are easily decoupled.

According to the one-touch coupling/decoupling apparatus for a robot foot having the above-mentioned structure, a method of coupling or decoupling a typical wearable robot is remarkably changed, which simplifies a structure of the robot foot and enables a user to easily couple or decouple the robot foot. In addition, there is an advantage in that, when the robot foot should be inevitably decoupled due to imbalance or an emergency, the robot foot can be easily decoupled in a short time by rotation, and thus safety of the user is guaranteed.

Although the exemplary embodiment of the present invention have been described for illustrative purposes, those skilled in the art will appreciate that various modifications, additions and substitutions are possible, without departing from the scope and spirit of the invention as disclosed in the accompanying claims.

What is claimed is:

1. A one-touch coupling/decoupling apparatus for a robot foot, comprising:
   a work shoe having a coupler protruding downwardly from a bottom of the work shoe; and
   a robot foot module coupled to the work shoe and including a plurality of latches, each of the latches having one end formed in a hook shape so as to be coupled with the coupler,
   wherein the robot foot module includes a disk-shaped base formed on a bottom of the robot foot module, a plurality of supports fixed to an upper side of the base, and a plurality of long bar-shaped push parts that are coupled to other ends of the latches and are vertically formed,
   wherein each of the latches is coupled to one of the push parts and one of the supports, respectively, by pins, and when the push parts are pressed downwardly, the one ends of the latches are rotated upwardly around the supports,
   wherein each of the push parts includes a first fixing protrusion that protrudes from a lateral face thereof and has an inclined face that narrows in a downward direction,
   wherein the robot foot module includes a plurality of long bar-shaped fixtures that are vertically formed outside the base so as to correspond to the push parts,
   wherein each of the fixtures includes a second fixing protrusion that protrudes from a lateral face thereof and has an inclined face that widens in a downward direction,
   wherein the inclined face of each first fixing protrusion slides along the inclined face of a respective one of the second fixing protrusions so that bases of the first and second fixing protrusions are caught and fixed, and
   wherein the disk-shaped base is coupled to the bottom of the robot foot module by a second elastic member, and returns to an original state by an elastic force of the second elastic member even when the disk-shaped base is rotated.

2. The one-touch coupling/decoupling apparatus according to claim 1, wherein each of the fixtures includes first elastic members.

3. The one-touch coupling/decoupling apparatus according to claim 1, wherein the latches, the push parts, and the fixtures are formed so that the one ends of the latches, when hooked, are disposed in opposite directions.

4. The one-touch coupling/decoupling apparatus according to claim 1, wherein:
   the bottom of the work shoe includes first connecting members;
   each push part of the robot foot module includes a second connecting member formed thereon; and
   the first and second connecting members are coupled to each other,
   wherein the first and second connecting members are each formed of a magnet, and
   wherein the first and second connecting members are coupled to each other by magnetic force so as to prevent the work shoe and the robot foot module from being decoupled after being coupled.

* * * * *